United States Patent [19]

Hankinson

[11] Patent Number: 4,584,163
[45] Date of Patent: Apr. 22, 1986

[54] REACTOR CAVITY SEAL RING

[75] Inventor: Michael F. Hankinson, Monroeville, Pa.

[73] Assignee: Westinghouse Electric Corp., Pittsburgh, Pa.

[21] Appl. No.: 576,059

[22] Filed: Feb. 1, 1984

[51] Int. Cl.$^4$ .................. G21C 13/06; B65D 53/00
[52] U.S. Cl. ........................ 376/205; 220/240; 220/327; 220/378
[58] Field of Search .......... 376/203, 205; 220/240, 220/327, 378; 277/27

[56] References Cited

U.S. PATENT DOCUMENTS

| | | | |
|---|---|---|---|
| 2,800,231 | 7/1957 | Hicks | 220/327 |
| 2,910,209 | 10/1959 | Nelson | 220/378 |
| 3,633,784 | 1/1972 | Taft | 376/205 |
| 3,812,008 | 5/1974 | Fryer | 376/205 |
| 4,070,221 | 1/1978 | Anthony | 376/205 |
| 4,170,517 | 10/1979 | Meuschke et al. | 376/205 |

Primary Examiner—Charles T. Jordan
Assistant Examiner—Richard Klein
Attorney, Agent, or Firm—Daniel C. Abeles

[57] ABSTRACT

A hydrostatic seal for sealing an annular gap between two flat substantially horizontal coplanar surfaces, and particularly a gap in a nuclear reactor cavity which comprises a generally flat annular plate of a width sufficient to span the gap between the two surfaces, compressible annular sealing rings or gaskets disposed on the bottom surface of the flat annular plate for sealingly engaging the two flat surfaces when a downward force is exerted on the plate, and a plurality of fastening arrangements, distributed along the center line of the plate, for releasably fastening the plate in a position to span the gap and exert a downward force on the plate. Each of the fastening arrangements includes a pair of elongated members of a size to fit into the gap, with the members being mounted on the bottom surface of the plate so that at least a portion of each member is radially moveable in a direction toward a respective one of the vertical side surfaces defining the gap to engage same, and an actuator, which extends through a bore in the plate to its upper surface, for radially moving the members.

14 Claims, 4 Drawing Figures

REACTOR CAVITY SEAL RING

BACKGROUND OF THE INVENTION

The present invention relates to hydrostatic seal ring, and in particularly relates to a hydrostatic seal for a nuclear reactor vessel cavity.

In most commercial nuclear plants, the reactor vessel is positioned within a concrete cavity in the containment arrangement, with the cavity having a upper portion above the vessel which defines the refueling chamber or channel. This refueling chamber or channel is maintained dry during normal reactor operation. However, during refueling of the reactor, the refueling chamber or channel is filled with water, with the water level being sufficiently high to maintain adequate shielding so as to maintain the radiation levels within acceptable limits when the fuel assemblies are removed completely from the reactor vessel. The height of such flooding water in the refueling channel or chamber is, for example, 24 to 28 feet.

To prevent the flooding water from passing into the lower portion or well of the reactor cavity, and damage instrumentation and insulation for the reactor vessel, an approximately two inch wide expansion gap provided between the reactor vessel and the concrete wall, or a portion of the concrete wall, must be sealed. This is accomplished by providing a seal between a flange or sealing ledge on the reactor vessel and the wall of the cavity. One type of seal which has been used by many utilities is an inflatable bladder type seal which is disposed between the vertical surfaces of the reactor vessel flange or sealing ledge and the cavity wall. However, such seals require machined vertical surfaces on both sides of the seal in order to be truly effective, and consequently many utilities have encountered insurmountable problems with such seals and desire a retrofit seal ring which requires no or substantially no modifications to the existing plant structure.

A further type of reactor cavity seal ring is disclosed in U.S. Pat. No. 3,633,784, issued Jan. 11, 1972 which is assigned to the same assignee as the present application. The reactor cavity seal ring disclosed in this patent relies on a ring which is set or embedded in the concrete wall and which is installed during plant construction. Clamps bolted to the set or embedded ring are then used to compress a cover plate, which in turn compresses sealing gaskets disposed in the surface of the embedded ring and in the machined surface of the reactor vessel flange. While such a sealing arrangement is quite satisfactory when part of the original plant design, it is generally impractical to install in cases where, in an existing plant, a thick ring or other base plates do not already exist.

SUMMARY OF THE INVENTION

It is therefore an object of the present invention to provide an improved reactor cavity sealing ring which can be used not only as an original design, but which moreover can be used as a retrofit reactor cavity seal ring which does not require any clamps or fixtures embedded in the concrete structure or vertical machined surfaces for sealing.

The above object is generally achieved according to the invention by a hydrostatic seal for sealing an annular gap between two flat substantially horizontal coplanar surfaces which comprises: a generally flat annular plate of a width sufficient to span the gap between the two surfaces; compressible annular sealing means disposed on the bottom surface of the flat annular plate for sealingly engaging the two flat surfaces when a downward force is exerted on the plate; and a plurality of fastening means, distributed along the center line of the plate, for releasably fastening the plate in a position to span the gap and exert a downward force on the plate, and with each of the fastening means including a pair of elongated members of a size to fit into the gap, means for mounting the members on the bottom surface of the plate so that at least a portion of each member is radially moveable in a direction toward a respective one of the vertical side surfaces defining the gap to engage same, and an actuating means, which extends through a bore in the plate to the upper surface of same, for radially moving the members.

According to features of the invention, the members are elongated arms which are pivotally mounted on the bottom surface of the plate, the actuating means includes a bolt which is mounted on the plate so that it is free to rotate but restrained from translation, a nut is disposed on the bolt between the arms but is prevented from rotating, and a wedge plate is mounted on the bolt between the nut and bottom surface of the plate for forcing the arms outwardly upon rotation of the bolt. With the sealing ring as described, the elongated arms are inserted into the gap, and in particular the expansion gap between the reactor vessel flange or sealing ledge and the cavity wall, and then the bolt is rotated at the upper surface of the flat plate. Rotation of the bolts causes the nut and the wedge plate to be moved upwardly, i.e. toward the bottom surface of the plate, and consequently the arms to be pivoted outwardly till they wedge against the vertical side walls defining the gap. Further rotation of the bolt compresses the annular sealing means or gaskets disposed on the lower surface of the plate.

According to a further feature of the invention, and in order to prevent leakage during initial cavity flooding, i.e. when there is a minimum of downward force on the top surface of the plate, the sealing ring is provided with two types of annular sealing gaskets, i.e. a low pressure gasket which is easily compressed by the downward force exerted by the fastening arrangements for low pressure sealing, and a medium force gasket which is only partially compressed by the downward force exerted by the fastening means. Full compression of the medium force gasket is achieved by the weight of the water above the seal, and by slotted connections between the elongated arms and the cover plate which allows the plate to be depressed relative to the arms as the water pressure increases.

Finally, according to a further feature of the invention, a plurality of jack screws are disposed about the outer periphery of the annular plate so that, during normal operation of the reactor, and with the pivotal arm all being disengaged form the side walls defining the gap, the sealing ring can be raised sufficiently to permit air circulation via the gap around the reactor.

The invention may be utilized in nuclear reactors of the pressurized liquid type or of the gas cooled type.

DETAILED DESCRIPTION OF THE PREFERRED EMBODIMENTS

Figure 1:
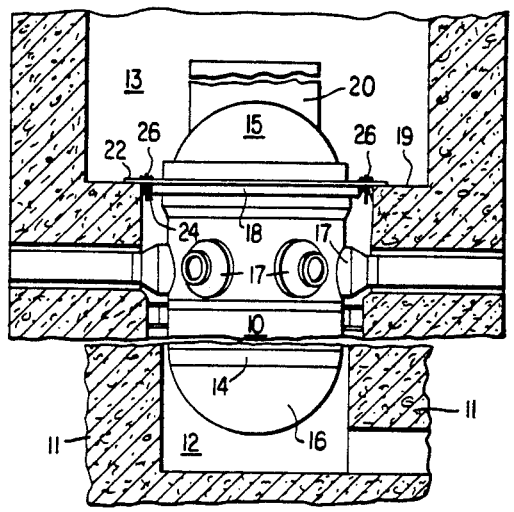
FIG. 1 is a side view, partially in section, of a reactor vessel disposed in a reactor cavity and with a sealing ring according to the invention.

Referring now to FIG. 1, there is shown a nuclear reactor vessel 10 which is disposed in a generally circular reactor cavity essentially formed by a concrete wall 11. The reactor cavity is divided into a lower portion 12, which surrounds the vessel structure itself, and an upper portion 13 which is commonly utilized as a refueling chamber or channel. As shown, the vessel 10 is spaced from the concrete wall 11 defining the reactor cavity so as to provide for expansion of the reactor vessel 10 during operation as well as to permit air circulation around the reactor vessel.

The illustrated reactor is of the pressurized liquid type wherein the pressure vessel 10 has a generally cylindrical body 14, a generally hemispherical upper head or end 15, and a generally hemispherical lower end 16. The cylindrical body 14 is provided with a plurality of nozzles 17 for the connection of the piping for the primary loop for the reactor power system. The upper end 15 of the reactor vessel 10 is provided with a laterally extending flange 18 whose upper surface is essentially coplanar with a horizontal annular surface 19 formed on the wall 11. A control rod drive mechanism housing 20 is disposed on top of the upper head 15.

As discussed above, during refueling of the reactor, the upper cavity portion or refueling chamber 13 is flooded with water. To prevent the water from entering the lower cavity portion 12, a flat annular sealing ring 22, which is preferably made of steel, is positioned to span the annular space or gap 24 between the flange or ledge 18 and the concrete wall 11. As shown, the annular sealing ring or plate 22 is of sufficient width to cover the upper surface of the flange 18 and a portion of the annular surface 19 on the concrete wall 11. The upper surface of the flange or ledge 18 and the surface 19 are preferably machined to provide substantially flat surfaces so as to enable proper sealing. The plate 22 is fastened or fixtured in the gap 24 by a plurality of fastening arrangements 26 which extend into the annular gap 24 and, when fastened, exert a downward force on the plate 22 so as to at least partially compress sealing gaskets (not shown in this figure) disposed between the plate 22 and the upper surfaces of the flange 18 and between the plate 22 and the surface 19. The details of the fastening arrangements 26 and of the plate 22 are more clearly shown in FIGS. 2-4.

Figure 4:
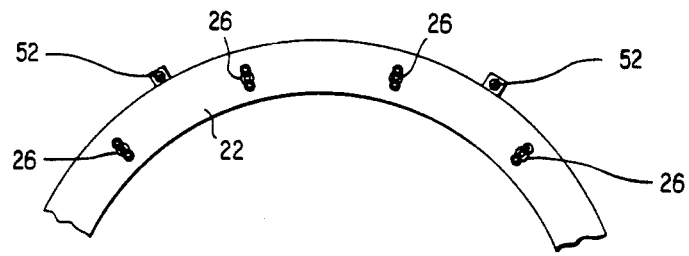
FIG. 4 is a top plan view of one half of the symmetrical sealing ring according to the invention.
Figure 3:
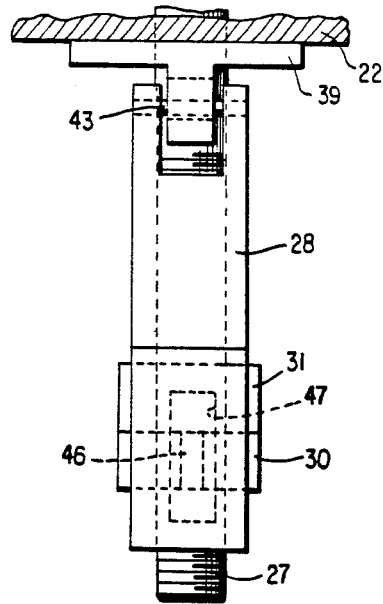
FIG. 3 is a side view in the direction A—A of FIG. 2.
Figure 2:
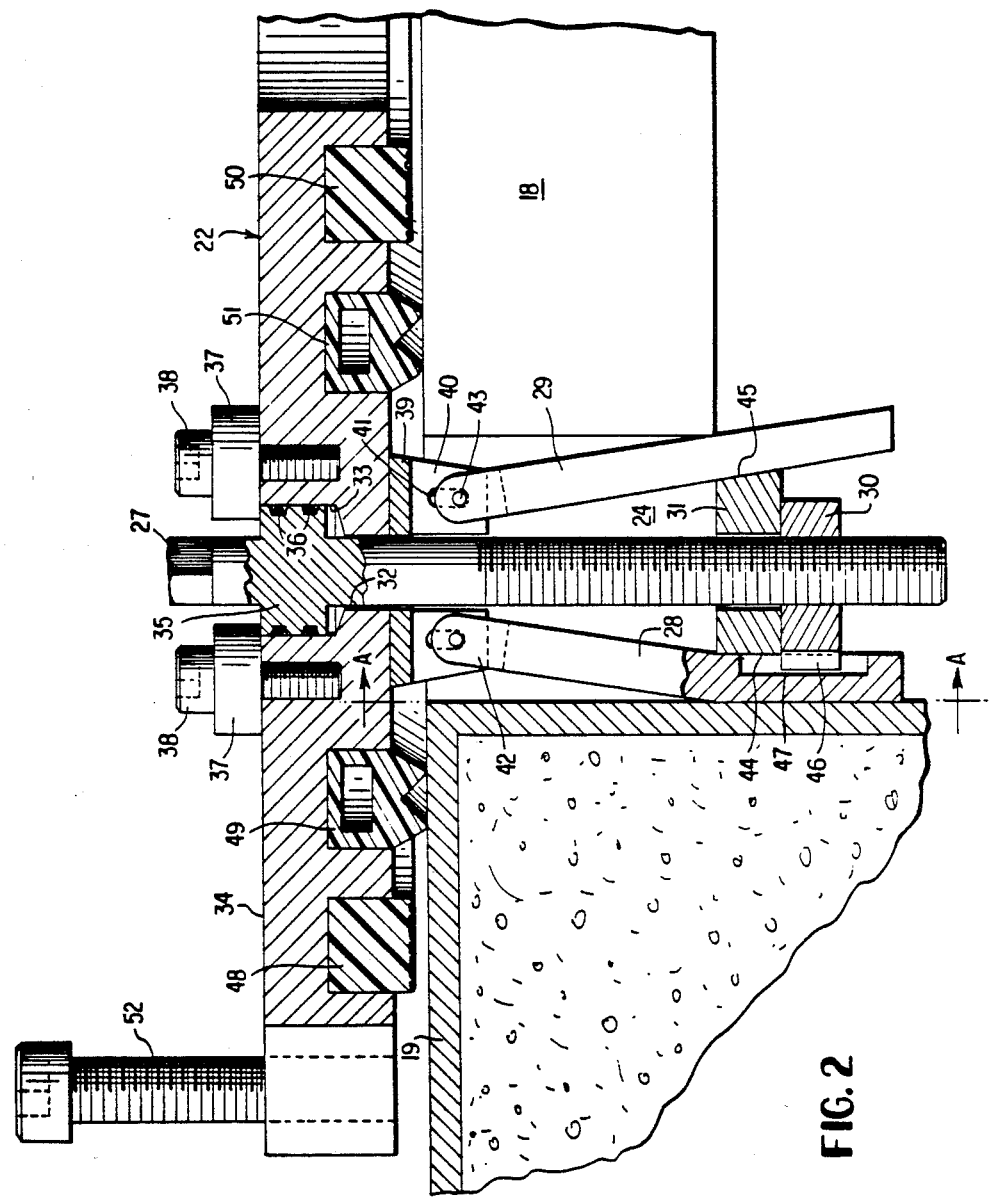
FIG. 2 is an enlarged view, partly in elevation and partly in section, illustrating the features of the sealing ring according to the invention.

As shown in FIGS. 2-4, each of the fastening arrangements 26 includes a bolt 27, a pair of elongated arms 28, 29, a nut 30, and wedge block 31. A plurality of such fastening arrangements 26, as shown in FIG. 4, are distributed about the center line of the plate 22 with equal spacing, and with, for example, twenty of such fastening arrangements 26 being provided for a typical sealing ring according to the invention.

Each of the bolts 27 is mounted in a bore 32 which extends through the plate 22 and is provided with a widened portion 33 adjacent the upper surface 34 of the plate 22. Likewise, the bolt 22 is provided with an widened portion or annular flange 35 whose diameter essentially corresponds to that of the widened portion 33 of the bore. In order to assure a liquid sealing engagement between the peripheral surface of the widened portion or flange 35 and the adjacent inner wall of the bore portion 33, a plurality of O-ring seals 36, two as shown, are provided in corresponding grooves on the peripheral surface of the flange 35. Alternatively, the inner wall of bore portion 33 may be provided with grooves in which seals 36 are retained; in this case, the peripheral surface of flange 35 will be smooth. The bolt 27 is retained in the illustrated position by means of a pair of retainer washers 37 which are fastened to the upper surface 34 of the plate 22 via respective bolts 38 which are threaded into corresponding holes in the plate 22. With this arrangement, the bolt 27 is free to rotate within the bore 32 but is prevented from translational movement along its longitudinal axis.

The two elongated arms 28 and 29 are mounted or suspended from the lower surface of the plate 22 via a collar 39 having a T-shaped cross section at its two ends facing the side walls defining the gap 24. The vertical leg 40 of each T-shaped cross section is provided with a slot 41 which is elongated in the vertical direction, i.e. peripendicular to the surface of the plate 22. Each of the two arms 28 and 29 is in turn provided with a U-shaped upper end 42 which straddles the vertical leg 40 and is pivotably connected thereto via a pivot pin 43 which is connected to each of the legs of the U-shaped end 42 and extends through the slot 41. Although both elongated arms 28 and 29 may be straight arms, since in a nuclear reactor the ledge or flange 18 is only of a limited small thickness, e.g. 2 to 3 inches, whereas the portion of the wall 11 defining the gap 24 extends substantially deeper toward the bottom of the reactor cavity, in order that the arms 28 and 29 symmetrically engage the side wall 11 and the edge surface of the flange 18, respectively, when the arms are radially pivoted outwardly, the arm 28 is provided with a slight bend at its lower end, as shown.

To pivot the arms 28 and 29 about the respective pivot pins 43 in a radially outward direction, the wedge block 31 with the nut 30 therebelow are mounted on the lower end of the bolt 27. The wedge block 31, which is free to slide along the bolt 27, has generally rectangular upper and lower surfaces and inclined side surfaces 44 and 45 which engage the inner or back surfaces of the arms 28 and 29 respectively so as to cause the arms to be spread or pivoted outwardly when the wedge block is moved along the bolt 27 toward the bottom surface of the plate 22. Such movement of the wedge block 31 can be brought about by rotation of the bolt 27 relative to the nut 30, which, although screwed on the bolt 27, is prevented from rotating by means of a radially outwardly extending projection 46 which is engaged in a slot 47 in the inner or back surface of the arm 28. Consequently, the rotation of the bolt 27 will cause the nut 30 to move either upwardly or downwardly along the axis of the bolt 27, depending on the direction of rotation. As shown, the lower end of the slot 47 is preferably closed in order to limit the downward travel of the nut 32, and thus prevent the nut 30 from accidently being screwed off of the lower end of the bolt 27.

In order to seal the plate 22 to the surface 19 in the upper surface of the flange 18, the bottom surface of the plate 22 is provided with two pairs of annular sealing rings or gaskets 48, 49 and 50, 51, with the gaskets 48, 49 contacting the surface 19 and the gaskets 50, 51 contacting the upper surface of the ledge 18. The inner gasket 49 or 51 of each pair is a low pressure gasket which, as indicated, is substantially hollow and is easily compressed to provide sealing at low pressure by the downward force on the plate 22 caused by rotation of the bolt 27. The outer gasket 48 or 50 of each pair, however, is a medium force gasket which will only partially be compressed by the downward force exerted on the plate 22 by rotation of the bolt 27. However, the increasing weight of the water above the plate 22 will cause the seals 48, 50 to be fully compressed to provide high pressure sealing.

As indicated above, during normal operation of the reactor, it is desired that the ring 22 be raised, and supported in the raised position, to permit cooling air to flow through the gap 24 and into the lower portion 12 of the reactor cavity. In order to be able to lift the ring 22, a plurality of jack screws or studs 52 are provided around the outer periphery of the plate 22. Lowering of the jack screws 52, four of which are indicated as being present in the illustrated embodiment, causes the ring 22 to be raised to the desired height, provided that, of course, the arms 28 and 29 of each of the fastening assemblies 26 have been retracted or disengaged from the vertical walls defining the gap 24.

In order to use the described embodiment of the sealing ring for sealing the gap 24 prior to flooding of the upper cavity portion 13, after the reactor has cooled down the jack screws 52 are raised, and consequently the plate 22 is lowered so that the gaskets 49 and 51 rest on the surface 19 and on the upper surface of the flange 18, and so that the arms 28 and 29 (and associated parts) of the fastening arrangements 26 extend into the gap 24. The bolt 27 of each of the fastening arrangements 26 is then rotated in a direction to cause the respective wedge block 31 to move in an upward direction so as to spread the respective arms 28 and 29 until contact and wedging of same against the vertical side walls defining the gap 24 takes place. Thereafter, further rotation of the bolt 27 results in compression of the low pressure gaskets 49 and 51 and partial compression of the higher pressure gaskets 48 and 50, thus providing proper sealing during the intial cavity flooding. As the height of the water above the plate 22 increases, additional downward pressure will be exerted on the top surface of the plate 22 which, as a result of the slotted connection between the arms 28 and 29 and the collar 39, allows the plate 22 to be pressed downwardly so as to further compress the higher pressure seals 48, 50. Following refueling of the reactor, the above described procedure is reversed so as to retract the arms 28 and 29 and then raise the ring 22. It should further be noted, that in the event one of the fastening arrangements 26 becomes jammed, or otherwise becomes difficult to disengage, then access to the wedge block 31 and/or the nut 30 can be obtained simply by removing the retaining bolts 38 and the retaining washers 37, and removing the bolt 27 by screwing same out of the nut 30.

It will be understood that the above description of the present invention is susceptible to various modifications, changes and adaptations, and the same are intended to be comprehended within the meaning and range of equivalents of the appended claims.

I claim:

1. A hydrostatic seal for sealing an annular gap between two flat substantially horizontal coplanar surfaces comprising, in combination:
a generally flat annular plate of a width sufficient to span a gap between two surfaces; compressible annular sealing means disposed on the bottom surface of said flat annular plate for sealingly engaging the two flat surfaces in response to a downward force exerted on said plate; and a plurality of fastening means, distributed along the center line of said plate, for releasably fastening said plate in a position to span the gap to be sealed and exert a downward force on said plate, each said fastening means including a pair of elongated members of a size to fit into the gap to be sealed, means for mounting said members on said bottom surface of said plate so that at least a portion of each said member is radially moveable in a direction toward a respective one of the vertical side surfaces defining the gap to be sealed to engage same and so that said plate is moveable relative to said members in a downward direction in response to hydrostatic pressure applied to the upper surface of said plate when said members are engaging the vertical side surfaces of an annular gap, and an actuating means, mounted on said plate for movement therewith in response to hydrostatic pressure, for radially moving said members, said actuating means extending through a bore in said plate to the upper surface of said plate.

2. A hydrostatic seal as defined in claim 1 fastened in a gap formed between an annular flange on a nuclear reactor vessel and an annular surface on a structural wall surrounding said vessel.

3. A hydrostatic seal as defined in claim 1 wherein: said members are elongated arms; said means for mounting said members includes a collar, and means for pivotally mounting one end of each of said arms on said collar; and said actuating means includes a bolt which extends through said collar and between said arms, means for mounting said bolt on said plate so that it is rotatable about its longitudinal axis but restrained from translation along its said longitudinal axis, a nut disposed on said bolt between said arms, means for preventing rotation of said nut, and a wedge plate mounted on said bolt between said nut and said collar so that it is translatable along said bolt, said wedge plate having a respective inclined surface for engaging each said arm, whereby upon rotation of said bolt, said nut and said wedge plate will be translated along said bolt, causing said wedge plate to spread said arms in a radial direction.

4. A hydrostatic seal as defined in claim 3 wherein said means for pivotally mounting said arms includes: a pair of elongated slots, one for each of said arms, formed in said collar with the elongation of said arms, formed in said collar with the elongation of said slots extending perpendicular to the surface of said annular plate, and a respective pivot pin disposed in each said slot so that is can be pivoted in and translated along the respective said slot, each said pivot pin being connected to said one end of a respective one of said arms.

5. A hydrostatic seal as defined in claim 4 wherein said compressible annular sealing means includes at least two annular sealing gaskets, one for engaging each of the two flat surfaces.

6. A hydrostatic seal as defined in claim 5 wherein said compressible annular sealing means includes a pair of annular sealing gaskets for engaging each of the two flat surfaces, with one of said gaskets of each said pair being a low pressure gasket and the other of said gaskets of each said pair being a gasket which requires a greater force for compression.

7. A hydrostatic seal as defined in claim 6 wherein said other of said gaskets are disposed closer to the respective inner and outer peripheral edges of said annular plate than said low pressure gaskets.

8. A hydrostatic seal as defined in claim 3 wherein said means for mounting said bolt comprises: an enlarged portion for said bore extending through said plate with said enlarged portion being adjacent said upper surface of said plate; a radial flange on said bolt adjacent its upper end with said radial flange being disposed in said enlarged portion of said bore; and, means fastened to said upper surface of said annular plate, for normally preventing said radial flange from being withdrawn from said enlarged portion of said bore.

9. A hydrostatic seal as defined in claim 8 further comprising seal means for sealing any space between the peripheral edge of said radial flange and the wall defining said enlarged portion of said bore.

10. A hydrostatic seal as defined in claim 1 wherein: said compressible annular sealing means includes a pair of annular sealing gaskets engaging each of said two flat surfaces with one of said gaskets of each said pair of gaskets being a low pressure gasket and the other of said gaskets of each pair being a gasket which requires a greater force for compression; and said fastening means can exert a sufficient downward force on said plate to compress said low pressure gaskets.

11. A hydrostatic seal as defined in claim 10 for sealing a gap formed between an annular flange on a nuclear reactor vessel and an annular surface on a structural wall surrounding said vessel; and further comprising a plurality of jack screw means disposed about the outer periphery of said annular plate, for raising said annular plate to prevent sealing of the gap and permit air circulation when the reactor is in operation and said fastening means are disengaged.

12. In a nuclear reactor containment arrangement which is partially flooded with liquid during refueling of a nuclear reactor of the type which is refueled from the top including an enclosing structure having a generally circular cavity therein, a reactor vessel having a radially extending horizontal annular flange disposed in the cavity and spaced from the wall of the cavity to define an annular gap therebetween, an annular surface on the inner wall of said enclosing structure with said annular surface being substantially coplanar with the upper surface of said flange, and a hydrostatic seal for sealingly engaging the upper surface of said radially extending annular flange and said annular surface on said inner wall to seal said gap when the cavity is to be flooded to refuel the reactor; the improvement wherein said hydrostatic seal comprises: a generally flat annular plate of a width sufficient to span said gap between said two surfaces; compressible annular sealing means disposed on the bottom surface of said flat annular plate for sealingly engaging the two flat surfaces in response to a downward force exerted on said plate; and a plurality of fastening means, distributed along the center line of said plate, for releasably fastening said plate in a position to span said gap and exert a downward force on said plate, each said fastening means including a pair of elongated members of a size to fit into said gap, means for mounting said members on said bottom surface of said plate so that at least a portion of each said member is radially moveable in a direction toward a respective one of the vertical side surfaces defining said gap to engage same and so that said plate is moveable relative to said members in a downward direction in response to hydrostatic pressure applied to the upper surface of said plate when said members are engaging the vertical side surfaces defining said gap, and an actuating means, mounted on said plate for movement therewith in response to hydrostatic pressure, for radially moving said members, said actuating means extending through a bore in said plate to the upper surface of said plate.

13. An arrangement as defined in claim 12 further comprising a plurality of jack screw means, disposed about the outer periphery of said annular plate, for engaging said annular surface on said inner wall of said enclosing structure to raise said annular plate sufficiently to prevent sealing engagement of said sealing means with said two flat surfaces, and permit air circulation via said gap during operation of the reactor.

14. A hydrostatic seal as defined in claim 3 wherein said wedge plate is mounted on said bolt such that it spreads said arms when translated along said bolt in a direction toward said collar.

* * * * *